United States Patent
Kaplan et al.

(10) Patent No.: US 10,024,728 B2
(45) Date of Patent: Jul. 17, 2018

(54) CIRCUIT AND ARRANGEMENT FOR 3-WIRE MEASUREMENTS WITH INPUT PROTECTION

(71) Applicant: Linear Technology Corporation, Milpitas, CA (US)

(72) Inventors: Todd Stuart Kaplan, Grass Valley, CA (US); David Edward Bliss, Loomis, CA (US); Michael Keith Mayes, Nevada City, CA (US)

(73) Assignee: Linear Technology LLC, Milpitas, CA (US)

( * ) Notice: Subject to any disclaimer, the term of this patent is extended or adjusted under 35 U.S.C. 154(b) by 220 days.

(21) Appl. No.: 15/175,974

(22) Filed: Jun. 7, 2016

(65) Prior Publication Data

US 2017/0102272 A1 Apr. 13, 2017

Related U.S. Application Data

(60) Provisional application No. 62/239,632, filed on Oct. 9, 2015.

(51) Int. Cl.
*G01K 7/16* (2006.01)

(52) U.S. Cl.
CPC ......... *G01K 7/16* (2013.01); *G01K 2007/163* (2013.01)

(58) Field of Classification Search
None
See application file for complete search history.

(56) References Cited

U.S. PATENT DOCUMENTS

| | | | | | |
|---|---|---|---|---|---|
| 4,102,199 | A | * | 7/1978 | Tsipouras | G01K 1/026 374/167 |
| 4,123,698 | A | * | 10/1978 | Timko | G01K 7/01 323/316 |
| 4,556,329 | A | * | 12/1985 | Benson | G01K 7/21 374/173 |
| 4,929,092 | A | * | 5/1990 | Taguchi | G01K 1/18 338/239 |
| 5,317,520 | A | * | 5/1994 | Castle | G01K 7/20 374/172 |
| 8,305,186 | B1 | * | 11/2012 | Myers | H01C 7/06 338/25 |
| 2013/0002358 | A1 | * | 1/2013 | Mitchell | G01D 3/036 330/289 |

* cited by examiner

*Primary Examiner* — Andre Allen
(74) *Attorney, Agent, or Firm* — VLP Law Group, LLP; Edward C. Kwok

(57) ABSTRACT

A method and a circuit take a measurement of a sensor having first, second and third lead wires by: (a) providing first, second and third terminals for voltage measurements; (b) connecting a current sensing device (e.g., a reference resistor) to provide a signal at the third terminal that is indicative of the current in the third lead wire of the sensor; (c) connecting a first protective device between the first lead wire of the sensor and the first terminal; (d) connecting a second protective device between the second lead wire of the sensor and the second terminal; (e) connecting a first current source to the first lead wire of the sensor; (f) connecting a second current source to the second lead wire of the sensor; and (g) measuring a first voltage across the first and second terminals and a second voltage across the third terminal and the voltage reference.

13 Claims, 2 Drawing Sheets

CIRCUIT AND ARRANGEMENT FOR 3-WIRE MEASUREMENTS WITH INPUT PROTECTION

CROSS REFERENCE TO RELATED APPLICATIONS

The present application relates to and claims priority of U.S. provisional patent application ("Copending Application"), Ser. No. 62/239,632, filed Oct. 9, 2015, entitled "Circuit and Arrangement For 3-Wire Measurements with Input Protection." The disclosure of the Copending Application is hereby incorporated by reference in its entirety.

BACKGROUND OF THE INVENTION

1. Field of the Invention

The present invention relates to 3-wire measurements. In particular, the present invention relates to remote 3-wire resistive measurements.

2. Discussion of the Related Art

Resistance temperature detectors (RTDs) and other resistive measurement elements are often required at remote locations. When making these resistive measurements, the lead wires to the resistive elements can contribute significant resistance and thus degrade the measurement accuracy. One method for reducing the effect of such resistance uses a 4-wire measurement, which requires four wires connected to the remote sensor. Many users have found such a measurement device undesirably complex.

One technique for reducing the effect of lead wire resistance is the "3-wire measurement." A 3-wire measurement may reduce the effect of lead wire resistance, while only requiring three wires to connect to the remote sensor. FIG. 1 illustrates a typical configuration for a 3-wire measurement. As shown in FIG. 1, resistor $R_M$, representing the resistance to be measured, is connected to a measurement device across terminals 101 and 102 by resistors $R_{L1}$, $R_{L2}$, $R_{p1}$ and $R_{p2}$. Resistors $R_{L1}$ and $R_{L2}$ represent the resistances of the lead wires, and resistors $R_{P1}$ and $R_{P2}$ represent additional resistances (e.g., resistances of protection resistors, which being shorted to a power supply). By measuring voltage $V_{RM}$ across resistor $R_M$ and the voltage across known current-sensing resistor $R_S$ between terminals 103 and 104, the resistance of resistor $R_M$ may be determined based on the known currents supplied by current sources 105 and 106. Terminal 104 is typically connected to a common ground reference. Ideally, voltage $V_{RM}$ across resistor $R_M$ is measured directly. However, when resistor $R_M$ is located at a remote location, a user has access only to voltage $V_M$ across terminals 101 and 102 of the measurement device. Ideally, $V_M = V_{RM}$. To ensure $V_M = V_{RM}$, currents $I_1$ and $I_2$ are forced by current sources 105 and 106 into leads connecting $R_M$. For matching connections (i.e., $R_{L1} = R_{L2}$ and $R_{p1} = R_{p2}$), the voltage drops across resistors $R_{L1}$ and $R_{p1}$ and across $R_{L2}$ and $R_{p2}$ are the same, and thus $V_M = V_{RM}$. However, a mismatch in the connections results in errors. For example, when current sources 105 and 106 provide the same current (i.e., $I_1 = I_2 = I$):

$$V_M = V_{RM} + I^*(R_{L1} - R_{L2} + R_{P1} - R_{P2})$$

Thus, the error between measured voltage $V_M$ and actual voltage $V_{RM}$ across resistor $R_M$ is proportional to the difference between the resistances in the two paths. With identical current sources, the average lead resistance between the two legs cancels each other, but the difference in lead resistance between the two legs does not. Therefore, the 3-wire measurement is accurate only to the extent that the lead resistances of the two legs can be minimized or equalized. Because wires have relatively low resistances and can be relatively easy to match, the 3-wire measurement technique is widely used.

However, the 3-wire measurement loses accuracy when additional resistors are added. Such additional resistors are added, for example, when an undesired shorting of resistor $R_M$ to a voltage source is possible. The additional resistors protect the measurement device from being damaged. The protection resistance (i.e., $R_{p1}$ and $R_{p2}$) can be significantly larger than the lead wire resistance (i.e., $R_{L1}$ and $R_{L2}$) to properly protect the measurement device. Often, a very significant mismatch exists between the resistances in the two legs that connect resistor $R_M$. Because such a mismatch adversely impacts measurement accuracy, a 3-wire measurement that works effectively under such a condition is desired.

Two methods improve matching by either reducing the resistance in both legs or improving matching between the additional resistors of the two legs. Reducing the resistance in both legs results in a larger current being allowed to flow in the measurement device, thus decreasing input protection, increasing power dissipation (i.e., given by $V_M^2/R$, where R is the sum of $R_M$, $R_{L1}$, $R_{L2}$, $R_{p1}$ and $R_{p2}$), and increasing circuit size and cost. Improving the matching between the additional resistors necessitates increasing cost. Secondary protection, such as a Zener diode, can be inserted between the resistive paths to provide a current sink at higher voltages. Such a diode adds cost and increases leakage currents, which can further degrade measurement accuracy. In general, the prior art systems suffer from difficult tradeoffs in cost, protection and accuracy.

SUMMARY

According to one embodiment of the present invention, a method and a circuit take a measurement of a sensor connected by first, second and third lead wires. The sensor may be, for example, a 3-wire resistance temperature detector (RTD). The method includes: (a) providing first, second and third terminals for voltage measurements; (b) connecting a current sensing device (e.g., a reference resistor) to provide at the third terminal a signal that is indicative of the current in the third lead wire of the sensor; (c) connecting a first protective device between the first lead wire of the sensor and the first terminal; (d) connecting a second protective device between the second lead wire of the sensor and the second terminal; (e) connecting a first current source to the first lead wire of the sensor; (f) connecting a second current source to the second lead wire of the sensor; and (g) measuring a first voltage across the first and second terminals and a second voltage across the third terminal and the ground reference. Optionally, the first and second current sources may be protected by third and fourth protective devices, respectively.

In some embodiments, an additional protective device may also be connected between the reference resistor and the third lead wire of the sensor.

The present invention is better understood upon consideration of the detailed description below in conjunction with the drawings.

BRIEF DESCRIPTION OF THE DRAWINGS

To facilitate the detailed description below, like reference numerals are assigned to like elements in the figures.

DETAILED DESCRIPTION OF THE PREFERRED EMBODIMENTS

Figure 1:
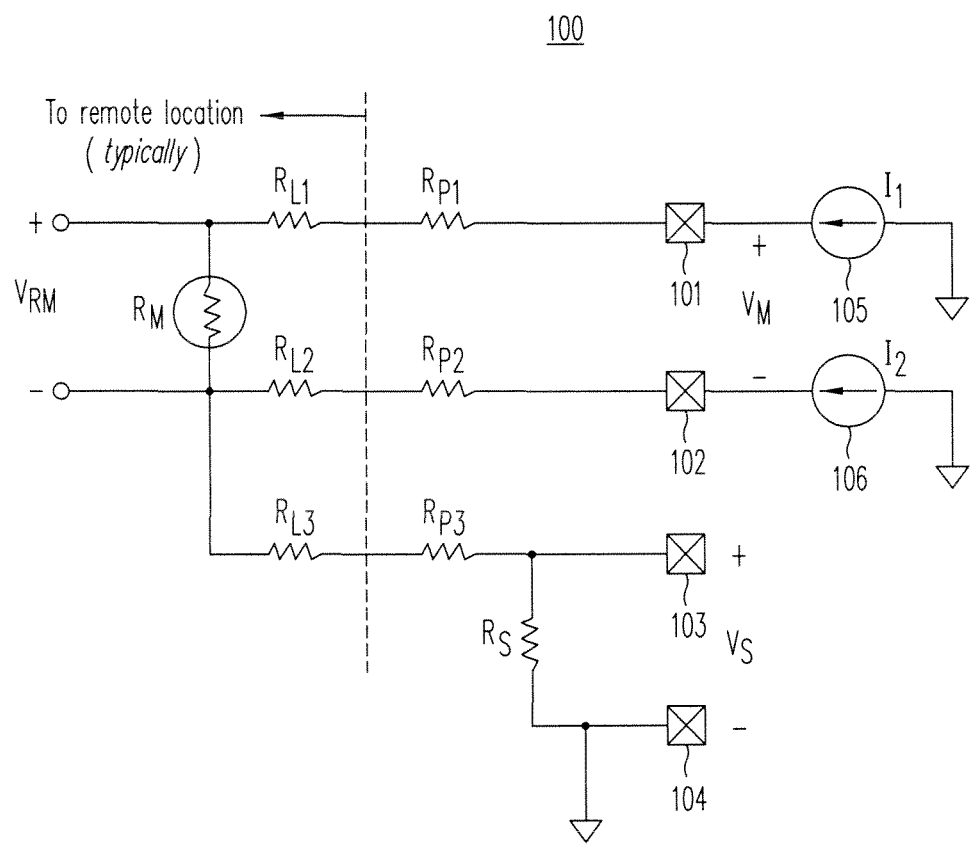
FIG. 1 illustrates a typical configuration for a 3-wire measurement.
Figure 2:
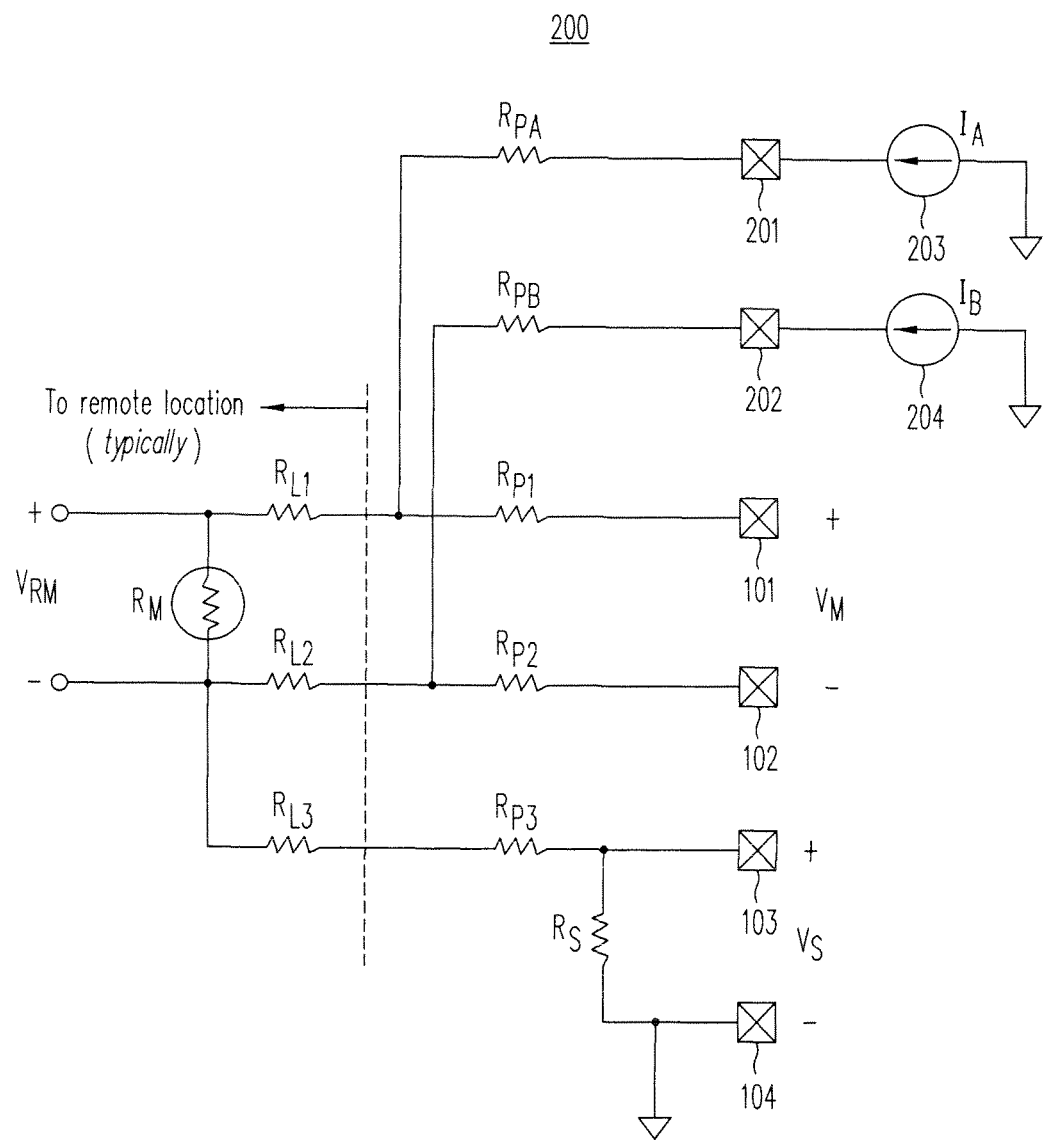
FIG. 2 shows configuration 200 for a 3-wire RTD, in accordance with one embodiment of the present invention.

According to one embodiment of the present invention, the current sources of a 3-wire RTD (e.g., current sources 105 and 106 of FIG. 1) are removed from the measurement pins and current sources are provided at the lead wires to the RTD. FIG. 2 shows configuration 200 for a 3-wire RTD, in accordance with one embodiment of the present invention.

As shown in FIG. 2, current sources 203 and 204 inject currents $I_A$ and $I_B$ into the two lead wires that connect to the resistive sensor element (i.e., resistor $R_M$), but not through the protective elements represented by resistors $R_{p1}$ and $R_{p2}$ for the measurement device at terminals 101 and 102. Current sources 203 and 204 may optionally be protected by additional protection devices, whose resistances are represented by resistors $R_{pA}$ and $R_{pB}$ in FIG. 2. In this manner, measurement errors caused by all the protection resistors (including protection resistors $R_{pA}$ and $R_{pB}$) are eliminated. Resistors $R_{pA}$ and $R_{pB}$ do not contribute to a measurement error, so long as such resistors do not affect the values of currents $I_A$ and $I_B$ injected in the lead wires represented by resistors $R_{L1}$ and $R_{L2}$. Resistors $R_{p1}$ and $R_{p2}$ also no longer contribute to a measurement error because, to the extent that the measurement device does not receive an appreciable input current (i.e., having high input impedance), there is no appreciable voltage drop across resistors $R_{p1}$ and $R_{p2}$. Thus, for example, in the case where current sources 203 and 204 provide the same current (i.e., $I_A=I_B=I$), any error in the measurement is due merely to the resistance mismatch in the lead wires:

$$V_M = V_{RM} + I^*(R_{L1} - R_{L2})$$

Thus, measurement errors resulting from the protection devices (e.g., resistors $R_{p1}$ and $R_{P2}$) have been eliminated. If the protection resistors are provided close to the measurement device, as they generally are, then the connection to current sources 203 and 204 are easily routed and only the method remains essentially the 3-wire measurement for a remotely connected resistor $R_M$.

While additional protection resistive devices may be placed between either current sources 203 and 204 and its respective lead wire, the resistance mismatch due to such resistive devices in the lead wires should be kept within a tolerance appropriate for the application.

While remote-sensing is an application in which any measurement circuit or configuration according to the present invention may be used, the present invention is applicable to other applications in addition to remote-sensing.

The above detailed description is provided to illustrate the specific embodiments of the present invention and is not intended to be limiting. Numerous modifications and variations within the scope of the present invention are possible. The present invention is set forth in the accompanying claims.

We claim:

1. A measurement circuit for connecting to a resistance temperature detector (RTD) having first, second and third lead wires, comprising:
   first, second and third terminals;
   a current sensing device coupled to the third terminal to provide a signal at the third terminal that is representative of a current in the RTD;
   a first protective device connected between the first lead wire of the RTD and the first terminal;
   a second protective device connected between the second lead wire of the RTD and the second terminal;
   a third protective device;
   a fourth protective device;
   a first current source connected by the third protective device to the first lead wire of the RTD, so as to inject a first predetermined current into the first lead wire of the RTD; and
   a second current source connected by the fourth protective device to the second lead wire of the RTD, so as to inject a second predetermined current into the second lead wire of the RTD.

2. The measurement circuit of claim 1, wherein the current sensing device comprises a reference resistor connecting both the third terminal and the third lead wire of the RTD to a voltage reference.

3. The measurement circuit of claim 1, further comprising a fifth protective device connected in series with a reference resistor and the third lead wire of the RTD.

4. The measurement circuit of claim 1, wherein one or more of the first, second, third and fourth protective devices each comprise a resistor.

5. The measurement circuit of claim 1, further comprising a fifth protective device connected in series with a reference resistor and the third lead wire of the sensor.

6. The measurement circuit of claim 1, wherein one or more of the first, second, third and fourth protective devices each comprise a resistor.

7. A measurement circuit for connecting to a sensor having first, second and third lead wires, comprising:
   first, second and third terminals;
   a current sensing device providing a signal at the third terminal that is representative of a current in the sensor;
   a first protective device connected between the first lead wire of the sensor and the first terminal;
   a second protective device connected between the second lead wire of the sensor and the second terminal;
   a third protective device;
   a fourth protective device;
   a first current source connected by the third protective device to the first lead wire of the sensor, so as to inject a first predetermined current into the first lead wire of the sensor; and
   a second current source connected by the fourth protective device to the second lead wire of the sensor, so as to inject a second predetermined current into the second lead wire of the sensor.

8. The measurement circuit of claim 7, wherein the current sensing device comprises a reference resistor connecting both the third lead wire of the sensor and the third terminal to a voltage reference.

9. A method for taking a measurement of a sensor having first, second and third lead wires, the method comprising:
   providing first, second and third terminals for voltage measurements;
   connecting a current sensing device to provide a signal at the third terminal that is representative of a current in the sensor;
   connecting a first protective device between the first lead wire of the sensor and the first terminal;
   connecting a second protective device between the second lead wire of the sensor and the second terminal;

connecting a first current source to the first lead wire of the sensor, so as to inject a first predetermined current into the first lead wire of the sensor;

connecting a second current source to the second lead wire of the sensor, so as to inject a second predetermined current into the second lead wire of the sensor; and measuring a first voltage across the first and second terminals and a second voltage across the third terminal and the ground reference.

10. The method of claim 9, wherein connecting the current sensing device comprises connecting a reference resistor across both the third terminal and the third lead wire of the sensor to a voltage reference.

11. The method of claim 9, wherein the first and second current sources are connected to the first and second lead wires of the sensor through third and fourth protective devices respectively.

12. The method of claim 11, wherein one or more of the first, second, third and fourth protective devices each comprise a resistor.

13. The method of claim 9, further comprising connecting an additional protective device in series with the reference resistor and the third lead wire of the sensor.

* * * * *